Figures 1, 2:
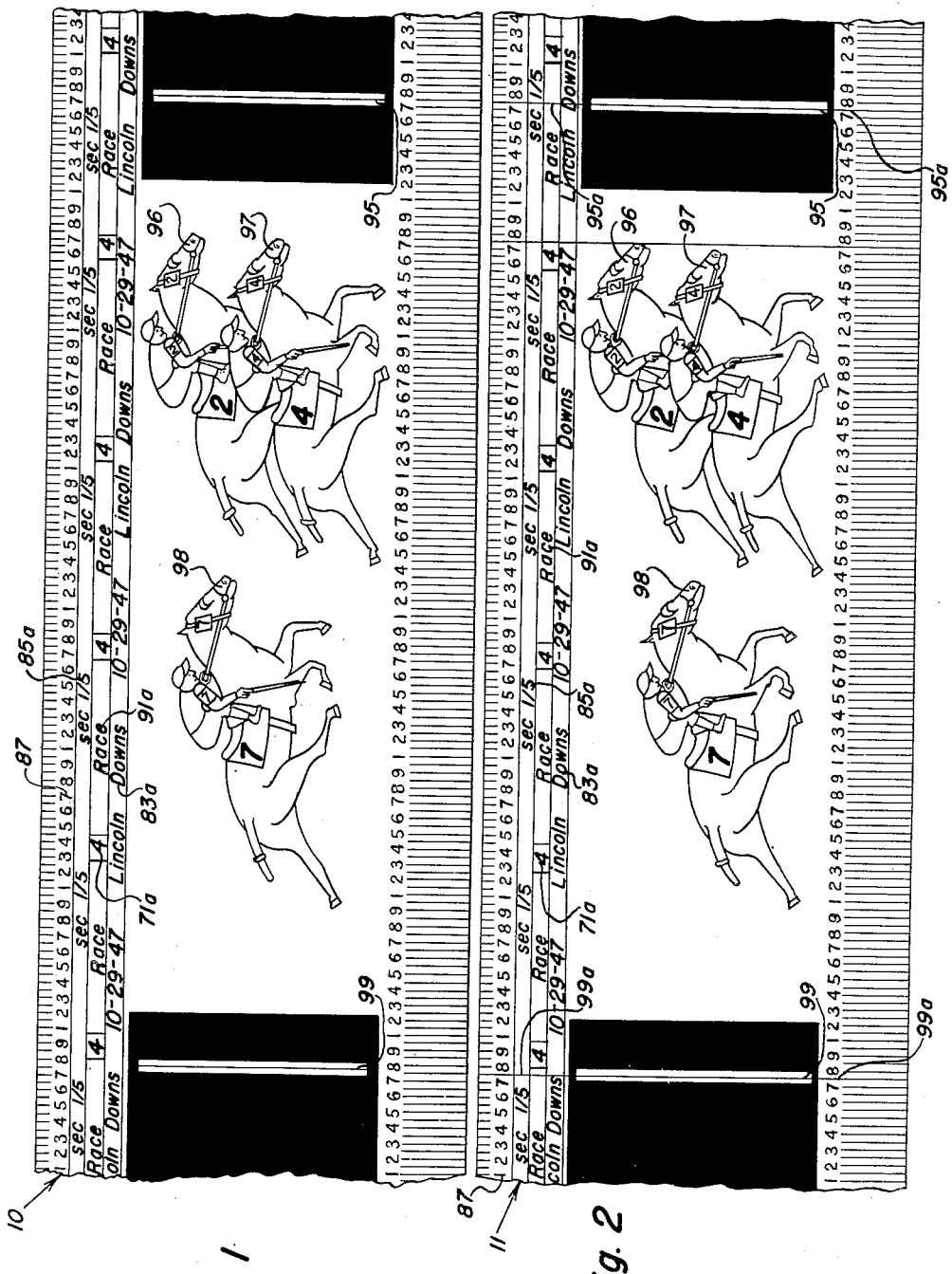

Nov. 19, 1957     J. J. JONES     2,813,468
PHOTO FINISH RECORD
Original Filed Dec. 15, 1947

INVENTOR
James J. Jones
By Strauch & Hoffman
Attorneys

United States Patent Office 2,813,468
Patented Nov. 19, 1957

2,813,468
PHOTO FINISH RECORD

James J. Jones, Hialeah, Fla.; Donna L. Jones, executrix of said James J. Jones, deceased Original application December 15, 1947, Serial No. 791,847, now Patent No. 2,482,621, dated September 20, 1949. Divided and this application August 15, 1949, Serial No. 110,393

2 Claims. (Cl. 95—1)

The present invention relates to photographic records for recording the relative positions of contestants as they cross the finish line of a race course. More particularly the present invention relates to photographic records containing informational data and aligned identified reference markings for construction of a determinative finish line and providing positive, accurate record proof of the order of finish of specified racing contests.

While photographic records of the finish of races have previously been made and used, see United States Letters Patent 2,320,350 to L. Del Riccio and 2,257,100 to H. D. Belock, such records have not been wholly satisfactory since they provided no means for positively proving the accuracy of the determinative finish line of the record. As a consequence, promoters of racing contests have been unable to secure permanent records of the finish of contests which could be relied upon with confidence in event of litigation by one seeking to establish, particularly in the case of a close finish, that a contestant other than the declared winner should have been adjudged the winner.

It, accordingly, is the primary object of the present invention to provide a photographic record which, in and of itself, provides positive proof of the correctness of the recorded finish and the correctness of the determination of the winner.

Still another object of the present invention resides in applying transversely aligned markings to a photographic film to assure accurate superimposition of markings to the intermediate portion of the film so as to locate predetermined points on said portion in alignment with opposed edge markings.

Still another object of the present invention resides in the provision of a photographic exposure of the finish of a race having a pictorial image of the contestants disposed between transversely aligned reference markings and a photographic image of the actual finish line disposed between the aligned reference marks in longitudinal spaced relation to said pictorial image so as to prove the parallelism of the opposed reference marks and the actual finish line.

Other objects will appear from the following description and appended claims when read in conjunction with the attached drawings wherein:

Figure 1 is a view of an exposed strip of film which will serve as a permanent and provable negative record of the finish of a racing contest; and Figure 2 is a view of a print made from the negative record of Figure 1 in which the determinative finish line used to establish the winner of the contest has been added.

The present application is a division of the application of James J. Jones, dated December 15, 1947, entitled Photo Finish Camera and Recording System, and bearing Serial No. 791,847, now Patent No. 2,482,621.

With continued reference to the drawings, wherein like parts are designated throughout by the same reference numerals, the numeral 10 indicates generally the negative film record of this invention and numeral 11 indicates the final record print of this invention.

Negative 10 consists of a suitable length of exposed film containing transversely spaced, similarly identified, aligned reference markings 86a, formed on the film. While these markings may be of any suitable character and may be formed by any suitable photographic or printing method, line markings, numbered as indicated at 87, photographed in longitudinally spaced relation along the opposite edges of the film in the manner disclosed in the copending United States application of James J. Jones, Serial Number 791,847 have been found to be particularly effective.

Negative 10 also contains a snapshot image 95 of the actual finish line across the race course made by a suitable camera set up to one side of and above the race course with the optical axis of its lens in longitudinal coincidence with the finish line and designed to assure presentation of the film to the lens with the reference markings in parallel alignment with the image 95. A suitable camera of the strip or continuous flow type is disclosed in the above identified application of James J. Jones and has been found to be particularly effective. Other identification data, consisting of images 71a, 83a, 85a, and 91a respectively, identifying the number of the race, the name of the race course and the date of the contest, time interval markings, and the word "Race" is also provided on the negative record to assure positive identification of the particular contest recorded on the film record. This additional data may be produced in any suitable manner but preferably in the manner disclosed in the aforementioned James J. Jones application.

The images 96, 97 and 98 etc., of the respective contestants are suitably photographed onto the film, preferably between the aligned reference markings as shown in Figure 1. Finally a second snapshot image 99 of the actual finish line on the race course is photographed onto film 10 adjacent the opposite end of the record strip.

While the negative may be produced by use of various types of cameras and methods, the camera and method preferred is that of the aforesaid James J. Jones application. Accordingly, the following detailed description of the preferred manner of producing the record will be made with reference to the strip or continuous flow type camera disclosed in said application.

To this end, a conventional strip camera provided with a main objective lens and slit aperture, film feed mechanism, film magazine, and rewind cabinet is provided in spaced relation along the film path with additional vertically spaced and aligned exposure slits and objective lenses focused for photographing informational data and reference markings displayed on an indicia bearing drum and a focal plane shutter for the main objective as disclosed in the aforesaid James J. Jones application. The camera is mounted above and about 150 feet to one side of the race course (preferably the inside) with the actual finish line of the race course in substantial alignment with the axis of the main objective. The finish line of the course preferably is surveyed to assure its accuracy from end to end. With the camera rigidly fastened in its set position and the focal plane shutter in closed operative position, the indicia bearing drum and film are set in motion to record the informational data and reference lines from the drum onto the edges of the film. After the edges of a suitable length of film have been exposed, the film and drum are stopped and the focal plane shutter is released to produce a snapshot image of the actual finish line. The film is then again set in motion and the exposed length is cut off and developed so that a check can be made to make sure that the reference lines and image of the actual finish line are parallel.

In event the desired parallelism does not exist, the necessary checks of the film feed and camera set up are made and such adjustments as may be necessary are made until the desired parallelism is obtained. When the parallelism of the reference lines and finish line prove, the camera is ready for operation.

Assuming a race is about to start and the camera has been proven as set forth above, a still snapshot of the actual finish line is made on the film in the manner previously mentioned to form the image 95 of the finish line. The focal plane shutter is then moved to its inoperative position and the film and indicia bearing drum are again set in motion a sufficient length of time before the contestants reach the actual finish line to assure the rotation of the drum at the predetermined timed speed and the film at the approximate speed of the images of the contestants as they cross the finish line. With the camera operating in this way, the images 71a, 83a, 85a, 86a and 91a of the reference lines and informational data on the drum are formed on the edges of film 23 and the images 96, 97 and 98 of the contestants crossing the finish line will be formed along the center of the film between the images 86a of the reference lines and under the images of the time interval markings 85a.

Since the film is continuously moving past the main slit and objective and as the effective field of view is delimited by the edges of the main objective slit to a narrow area, for all practical purposes the area of the actual finish line, images 96, 97 and 98 will be successively formed in the order in which the successive portions of the contestants cross the finish line of the race course. Also since the indicia bearing drum is continuously rotating at a predetermined speed, preferably one revolution per second, and the film moves at substantially the same speed, the images 85a and 86a will be formed on the edges of the film at equally spaced intervals to furnish an accurate time record showing the interval of time between the successively finishing contestants. As this time record is formed from mechanism housed in the camera and through objectives located closely to the accurately formed record indicia bearing drum, the time record on the film will be completely accurate and will not be subject to distortion by distance, heat waves and the like that would occur if the record drum were a substantial distance from the objectives.

After the last contestant has passed the finish line, a snapshot of the finish line is again made to record the image 99 at the opposite end of the photographic record. Thus the parallelism of reference line images 85a and 86a and the actual finish line can, after development of the film, be checked both before and after the production of the photographic record of the finish to prove the accuracy of the photographed reference lines and the setting of the camera.

The developed photographic film recording the finish of each contest will appear as illustrated in Figure 1 of the drawings. To definitely establish the parallelism of images 95 and 99 and reference lines 86a on the resulting negative 10, a straight edge is placed with its edge lying along the images 95 and 99. The extensions of lines 95 and 99 formed by the straight edge extending across the developed film to the edges of the film, due to the close proximity of the images 86a, will fall along opposite aligned reference lines or sufficiently close thereto to positively prove the parallelism. Since every other image line 86a is numbered or otherwise identified and as these image lines on each edge of the film are in fact photographs of the opposite ends of the same straight reference line, a checker is assured of proper parallelism if the straight edge extensions coincide with similarly identified lines on the opposite edges.

Being assured of the accuracy of the set up of the camera and the parallelism of reference lines 86a to the actual finish line because of the proven parallelism of the images of the actual finish line and reference lines 86a, a determinative finish line can be erected on the film record 10 by lining a straight edge touching the most advanced portion of the leading contestant up with the opposed similarly identified reference markings on each edge of the film. If actual erection of a determinative finish line on the negative record 10 is not desired, and usually this is not desired, the negative can be placed in a conventional photographic printer and a fine wire laid across the negative in the manner just described in connection with the straight edge and a positive print like that shown in Figure 2 can be printed to photographically produce the determinative finish line 101 on the final printed record 11.

In either case, the accuracy of the determinative finish line can be proven since the reference lines 86a are parallel to the images 95 and 99 of the actual finish line and the determinative finish line 101 is a continuation of the reference lines 86a. It follows that line 101 is exactly parallel to the actual finish line of the race course and that the actual true winner is shown by line 101.

In order to determine the time interval between the finish of the race by the successive contestants, the straight edge is successively placed upon opposite image lines 86a so as to just touch the most advanced portion of each successive contestant. By counting the number of lines 86a and 85a between the determinative finish line and the straight edge positioned as just pointed out, the actual finishing time of each contestant after the winner can be determined within approximately one two-hundredth of a second using the recorded finishing time of the winner and adding the fractional seconds between the winner and each successive contestant.

Production of a positive print of the photographic negative containing proof lines 95a and 99a and a determinative finish line 101 (Figure 2) is readily and quickly accomplished by placing the negative 10 in a conventional photographic printer with wires replacing the straight edge above referred to. From such a print, determination of the winner and counting of the fractional seconds between successive contestants can be done in a matter of minutes. Therefore, it will be appreciated that the present invention provides not only an accurate and permanent record of the finish of each contest but enables the accurate determination of the position and time of finish of each contestant within an extremely short time after the finish of each contest. Furthermore, since the informational data given by images 71a, 83a and 91a definitely identifies the race course, the date of the race and the number of the race, there can be no question as to the particular contest depicted by the record.

While proper positioning of the camera as to height above the race course will effectively eliminate the possibility of the image of one contestant obscuring the image of another contestant, difficulty of this nature may be effectively eliminated by placing a suitable plane mirror at the end of the finish line opposite that upon which the camera is set in well known manner. If such a mirror is used a mirror image of each contestant, showing each contestant as viewed from the opposite side of the track, will be produced on the film and this mirror image may be utilized as a further check on the winner since a properly drawn line 101 should touch the corresponding points of both images of the contestants. In event it is found that the film is not wide enough to accommodate the direct images, mirror images and desired informational data and reference lines, a wider film and a camera adapted to handle such wider film may be used without departing from the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters patent is:

1. In a strip type photographic record of the finish of a racing contest comprising a film strip only having a background area longitudinally extending thereon formed by a continuous image of a narrow transverse portion of the race course containing and axially paralleling the actual finish line on the race course and photographic images of the contestants in their respective order of passing into and through said portion of the race course and their respective positions transversely of the race course; means for assuring proper application of a transverse determinative finish line to said film strip to provably establish the true order of passage of contestants past said actual finish line comprising transversely spaced light transmitting areas formed on said film strip and extending longitudinally from end to end and adjacent said background area, each of said light transmitting areas containing line-like transversely extending, oppositely aligned, adjacent regions of differing light modifying characteristics disposed in transverse parallelism to the axis of said image of the narrow transverse portion of said race course and alternating longitudinally at closely spaced intervals and identifying means individual to spaced regions of similar light modifying characteristics in each of said longitudinally extending areas distinctively identifying corresponding and directly opposed regions of similar light modifying characteristics and adapting said directly opposed regions of similar light modifying characterstics for ready pairng as guide markings for locating a determinative finish line therebetween relative to any selected one of said images of said contestants and in parallelism to said actual finish line whereby said determinative finish line will be accurately applied to provably determine the order in which said contestants reach the portion of the race course containing the actual finish line of the race course.

2. In a strip type photographic record of the finish of a racing contest comprising a film strip only having a background area longitudinally extending thereon formed by a continuous image of a narrow transverse portion of the race course containing and axially paralleling the actual finish line on the race course and photographic images of the contestants in their respective order of passing into and through said portion of the race course and their respective positions transversely of the race course: means for assuring proper application of a transverse determinative finish line to said film strip to provably establish the true order of passage of contestants past said actual finish line comprising transversely spaced, light transmitting areas formed on said film strip and extending longitudinally from end to end and adjacent said background area, each of said light transmitting areas containing line-like transversely extending, oppositely aligned, adjacent regions of differing light modifying characteristics disposed in transverse parallelism to the axis of said image of said narrow transverse portion of the race course and alternating longitudinally at closely spaced intervals and identifying means individual to spaced regions of similar light modifying characteristics in each of said longitudinally extending areas distinctively identifying correspondng and directly opposed regions of similar light modifying characteristics and adapting said directly opposed regions of similar light modifying characteristics for ready pairing as guide markings for locating a determinative finish line therebetween relative to any selected one of said images of said contestants and in parallelism to said actual finish line whereby said determinative finish line will be accurately applied to provably determine the order in which said contestants reach the portion of the race course containing the actual finish line of the race course; and an image of the actual finish line on the race course disposed in said background area and extending perpendicularly to the longitudinal axis of the film and transversely of said background area in longitudinally spaced relation from the images of the contestants whereby the parallelism of the distinctively identified paired guide markings to the image of the actual finish line is established by data formed on the film record itself to avoid any inadvertent or intentional relative sloping of the determinative finish line between similar light modifying regions of said transversely spaced areas other than oppositely aligned pairs of similar distinctively identified guide markings.

References Cited in the file of this patent

UNITED STATES PATENTS

| | | |
|---|---|---|
| 212,865 | Muybridge | Mar. 4, 1879 |
| 516,278 | Petri | Mar. 13, 1894 |
| 621,314 | Barber | Mar. 21, 1899 |
| 2,257,100 | Belock | Sept. 30, 1941 |
| 2,302,331 | Kuprion | Nov. 17, 1942 |
| 2,320,350 | Del Riccio | June 1, 1943 |
| 2,348,401 | Manzanera | May 9, 1944 |
| 2,420,339 | Rabinow | May 13, 1947 |
| 2,430,975 | Crowley | Nov. 18, 1947 |
| 2,443,572 | Allen | June 15, 1948 |